(12) United States Patent
Sumita et al.

(10) Patent No.: US 8,044,356 B2
(45) Date of Patent: Oct. 25, 2011

(54) SURVEY METER

(75) Inventors: Akio Sumita, Yokohama (JP);
Syunichiro Makino, Kawasaki (JP);
Mikio Izumi, Yokohama (JP); Tetsuo Goto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1100 days.

(21) Appl. No.: 11/938,507

(22) Filed: Nov. 12, 2007

(65) Prior Publication Data

US 2010/0282975 A1 Nov. 11, 2010

(30) Foreign Application Priority Data

Nov. 13, 2006 (JP) .............................. P2006-306570

(51) Int. Cl.
*G01T 1/20* (2006.01)
(52) U.S. Cl. .................... 250/368; 250/370.11
(58) Field of Classification Search ............. 250/363.01, 250/366, 367, 368, 370.11
See application file for complete search history.

(56) References Cited

U.S. PATENT DOCUMENTS

| | | | | |
|---|---|---|---|---|
| 4,495,420 | A | * | 1/1985 | Chudy et al. ................... 250/367 |
| 5,471,062 | A | * | 11/1995 | Gritzo et al. ................... 250/368 |
| 6,333,502 | B1 | | 12/2001 | Sumita et al. |
| 6,407,392 | B1 | | 6/2002 | Tsuyuki et al. |
| 2005/0205794 | A1* | | 9/2005 | Ito et al. ......................... 250/367 |
| 2008/0217549 | A1* | | 9/2008 | Sato et al. ................. 250/370.11 |

FOREIGN PATENT DOCUMENTS

| | | |
|---|---|---|
| DE | 102 08 960 A1 | 9/2003 |
| EP | 0 604 947 A1 | 7/1994 |
| FR | 2 735 242 | 12/1996 |
| JP | 2001-56381 | 2/2001 |
| JP | 2005-241447 | 9/2005 |
| JP | 2005-265498 | 9/2005 |

OTHER PUBLICATIONS

European Search Report issued May 2, 2011 in European Application No. 07254431.5.
Japanese Office Action issued May 10, 2011 in Japanese Patent Application No. 2007-294432 filed Apr. 27, 2011.

\* cited by examiner

*Primary Examiner* — David Porta
*Assistant Examiner* — Faye Boosalis
(74) *Attorney, Agent, or Firm* — Oblon, Spivak, McClelland, Maier & Neustadt, L.L.P.

(57) ABSTRACT

A survey meter for measuring a radioactive contamination caused in an inner surface of a pipe includes a radiation detecting section and a signal processing section. The radiation detecting section includes a rod-shaped light guide unit, a reflecting portion connected to one end surface of the light guide unit, a photoelectric transfer unit, for outputting an electronic signal, connected to another one end surface of the light guide unit, and a scintillator unit provided to a circumference of the light guide unit. The signal processing section includes a pulse height discriminator for outputting a logic signal at a time when a pulse height value of the electronic signal outputted from the photoelectric transfer unit is higher than a threshold value, a counter unit for counting the logic signal, a contamination judging unit for judging whether a radioactive contamination is caused or not, and a display unit for displaying the value counted by the counter unit and a contamination judging result judged by the contamination judging unit.

13 Claims, 5 Drawing Sheets ical configuration and size of the radia-
SURVEY METER

BACKGROUND OF THE INVENTION

1. Field of the Invention

The present invention relates to a survey meter for inspecting whether an object is radioactively contaminated or not by measuring an amount of radiation irradiated from the object, and more particularly, relates to a survey meter having a structure capable of directly measuring the radioactive contamination caused on inner surface of a pipe, tube or the like having a small diameter.

2. Related Art

In a radiation handling facility such as a nuclear power station or the like, a law and relating regulations stipulate and oblige the facility to set a radiation management (controlled) area or site. Further, the law also obliges all objects and substances to undergo careful inspection for the radioactive contamination before the objects or the like are transported to outside from the radiation management area or site.

As a main inspection apparatus for inspecting whether the radioactive contamination is caused or not, there has been used a surface contamination survey meter. The surface contamination survey meter is classified and controlled so as to be selectively used in accordance with a kind and intensity of the radioactive rays, so that an operation for measuring the intensity of the radioactive rays using the survey meter can be normally performed under optimum conditions.

A representative example of a structure of the surface contamination survey meter is shown in FIG. 5. The survey meter includes: a scintillator unit 2 for emitting a fluorescent light generated by the radioactive ray irradiated from a surface of a measuring object (object to be measured) 16; a light guide unit 1 for converging the fluorescent light; a photoelectric transfer unit 3 for converting the fluorescent light into an electric signal; a pulse height discriminator 7 for discriminating the electric signal from a noise by a threshold value predetermined from a pulse height of the electric signal; a counter unit 8 for counting a signal outputted from the pulse height discriminator 7; and a display unit 10 for displaying a signal counting rate.

The above structures have been disclosed in the following patent documents. Namely, Patent Document 1 (Japanese Unexamined Patent Application Publication No. 2005-241447) discloses a radioactivity measuring apparatus using an optical fiber. Further, Patent Document 2 (Japanese Unexamined Patent Application Publication No. 2005-265498) discloses a surface contamination measuring apparatus and a radioactivity detecting unit.

In the above conventional surface contamination survey meters, the radiation detecting units are formed to provide various shapes such as rod-shape, conical-shape, flat plate-shape or the like. However, the radiation detecting units are basically designed on the assumption that the radiation detecting units are normally used for inspecting the radioactive contamination caused on an outer surface of the object to be measured. Therefore, with respect to a large contamination generating amount as waste of the pipe, tube or the like each having a small diameter, there has been posed a problem to directly measure an inner surface contamination of the pipe or tube in view of physical configuration and size of the radiation detecting units.

Further, for example, the above conventional "radioactivity measuring apparatus using an optical fiber" disclosed in the Patent Document 1 is configured such that a wavelength conversion optical fiber is provided so as to connect a portion between a long plate-shaped radiation detecting unit having a scintillator and a radiation measuring unit provided with a photo-multiplier tube, and a signal caused by α-rays detected by the radiation detecting unit is transmitted to the radiation measuring unit through the optical fiber. The Patent Document 1 states that the radioactivity measuring apparatus can measure the contamination caused on the inner surface of the pipe or the like.

However, in the conventional survey meter having the above structure, the radiation detecting unit is formed to provide a flat plate-shape. Therefore, in case of measuring the inner surface of the tube or the like, a distance between the inner surface of the pipe and a detecting surface is unavoidably apart to thereby form a disadvantageous gap therebetween. As a result, a radiation is attenuated and lowers a detecting efficiency. In particular, when the radioactive ray is α-ray or β-ray of a low energy level, the lowering of the detecting efficiency becomes more remarkable in comparison with a case where the surface of the measuring object and the detecting surface are tightly contacted to each other.

Further, the wavelength conversion optical fiber has a relatively large light transmission loss due to self-absorption in comparison with a transparent and colorless optical fiber. This light transmission loss is one factor of lowering the detecting efficiency. Accordingly, there has been posed a problem that it is impossible to secure a sufficient distance between the radiation detecting unit and the radiation measuring unit.

Furthermore, the above conventional "surface contamination measuring apparatus and a radioactivity detecting unit" disclosed in the Patent Document 2 is configured such that a scintillator is attached to an outer peripheral surface of a slender cylindrical pipe capable of transmitting a light, and one or more of the photo multiplier tubes are fixed to the pipe in a lance manner. In the latter case of fixing the plurality of photo-multiplier tubes, since output signals from adjacent photo multiplier tubes are added and revised so as to effectively suppress the deterioration of the detecting accuracy.

However, in the conventional survey meter having such structures as mentioned above, a size of the photo-multiplier tube is so large to occupy a large installation volume, so that there has been posed a problem and restriction that a diameter of the detecting portion cannot be formed to be smaller than that of the photo-multiplier tube. In addition, when the detecting portion is formed to be long, it becomes necessary to provide a plurality of photo-multiplier tubes, resulting in a high cost involved for manufacturing the survey meter. Further, since a gross weight of the survey meter is also increased, it becomes difficult and not easy to handle the survey meter.

As mentioned above, the detecting portion having the conventional structure cannot directly measure the radioactive contamination caused in a pipe or tube having a small diameter, the measuring operation cannot be performed with a high efficiency, the stabilization of a detecting sensitivity is difficult when the detecting portion is formed to be long, a manufacturing cost including working cost is disadvantageously high and the handling of the survey meter is not easy at the time of measuring operation.

SUMMARY OF THE INVENTION

The present invention conceived in consideration of the above circumstances encountered in the prior art mentioned above and an object thereof is to provide a survey meter having a structure capable of directly measuring the radioactive contamination caused on inner surface of a pipe, a tube or the like having a small diameter, and capable of performing the measuring operation with a high efficiency.

The above and other objects can be achieved according to the present invention by providing a survey meter for measuring a radioactive contamination caused in an inner surface of a pipe, the survey meter comprising:

a rod-shaped light guide unit having a predetermined length, the light guide unit including a first light guide section and a second light guide section, in which the first and second light guide sections are connected to each other at respective one end surfaces thereof;

a reflecting portion connected to another end surface of the first light guide section;

a photoelectric transfer unit, for outputting an electronic signal, connected to another one end surface of the second light guide section;

a scintillator unit provided to a circumferential surface of the light guide unit in which the first and second light guide sections are connected to each other;

a shielding member configured to transmit radioactive rays, block a light radiated from outside, and reflect a light within the scintillator unit;

a pulse height discriminator for outputting a logic signal at a time when a pulse height value of the electronic signal outputted from the photoelectric transfer unit is higher than a threshold value;

a counter unit for counting the logic signal outputted from the pulse height discriminator;

a contamination judging unit for judging whether a radioactive contamination is caused or not on the basis of a value counted by the counter unit; and a display unit for displaying the value counted by the counter unit and a contamination judging result judged by the contamination judging unit.

In preferred embodiment of the above aspect, the light guide unit may be formed to provide a polygonal shape in cross section such as hexagonal shape. The survey meter may further comprise a wavelength conversing member optically connected to a side-end surface portion of the scintillator unit. The wavelength conversing member may be wavelength fibers disposed along an entire longitudinal surface of the light guide unit. The scintillator unit may be formed to provide a flat-plate structure including a plurality of plate members and the wavelength fibers each composed of a fluorescence material and disposed between adjacent plate members, each of the fiber portions having one end surface connected to the reflecting portion and another end portion connected to the photoelectric transfer unit.

Further, the scintillator unit may be formed to provide a flat-plate structure provided to the side surface of the polygonal light guide unit, and the reflecting portion is disposed to a side surface in a longitudinal direction of the scintillator unit.

The first light guide section may be composed of a fluorescence conversion material and the second light guide section may be composed of a transparent material.

The light guide unit may be formed to provide a circular-column shape.

The photoelectric transfer unit may include two or more of photoelectric transfer elements, and the survey meter further comprising a coincidence-counting section which and processes the logic signal transmitted from the photoelectric transfer unit.

The survey meter may further comprise a light adapter unit disposed to a portion between the light guide unit and the photoelectric transfer unit so as to be connected thereto, and the reflecting portion is connected to a surface other than a connecting surface of the light adapter unit.

The shielding member may be an aluminum deposited Mylar film.

In a modified aspect of the present invention, there may be provided a survey meter for measuring a radioactive contamination caused in an inner surface of a pipe, the survey meter comprising:

a radiation detecting section including a rod-shaped light guide unit having a predetermined length, a reflecting portion connected to one end surface of the light guide unit, a photoelectric transfer unit, for outputting an electronic signal, connected to another one end surface of the light guide unit, and a scintillator unit provided to a circumference of the light guide unit; and a signal processing section including a pulse height discriminator for outputting a logic signal at a time when a pulse height value of the electronic signal outputted from the photoelectric transfer unit is higher than a threshold value; a counter unit for counting the logic signal outputted from the pulse height discriminator; a contamination judging unit for judging whether a radioactive contamination is caused or not on the basis of a value counted by the counter unit; and a display unit for displaying the value counted by the counter unit and a contamination judging result judged by the contamination judging unit.

According to the survey meter having the above characteristic features or structures, the light guide unit is configured by two guide members each having different characteristics so as to improve a light conversing property and a lower limit of detecting the radiation. Further, the radiation detecting section can be easily formed and assembled to have a long length and a small diameter with a low cost.

The nature and further characteristic features of the present invention will be made clearer from the following descriptions made with reference to the accompanying drawings.

DESCRIPTION OF THE PREFERRED EMBODIMENT

A preferred embodiment of a survey meter according to the present invention will be described hereunder with reference to the accompanying drawings.

First Embodiment

Figure 1:
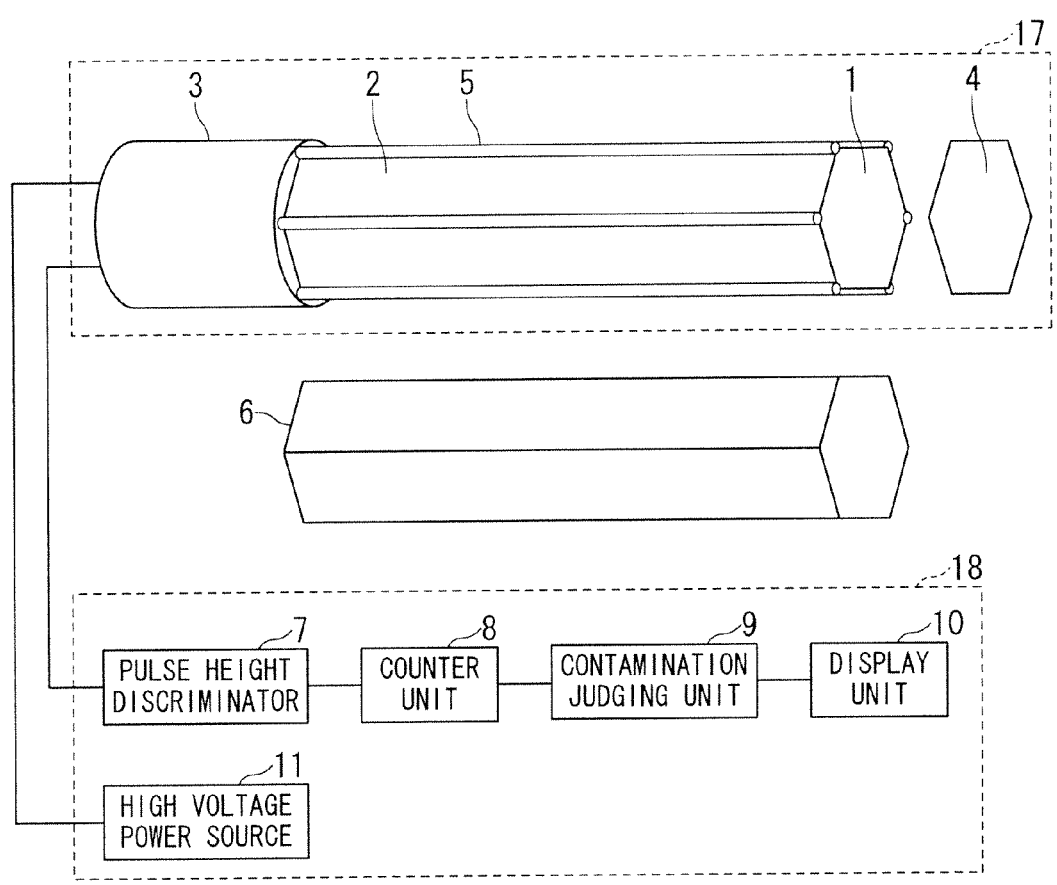
FIG. 1 is a schematic view showing a structure of a survey meter according to a first embodiment of the present invention.
Figure 2A:
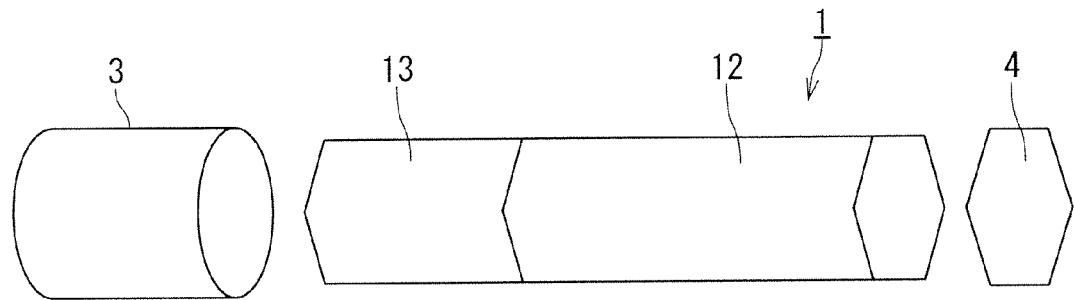
FIG. 2 is a perspective view showing an essential portion of the survey meter according to the first embodiment of the present invention and includes FIGS. 2A and 2B which represent examples of a radiation detecting section of the survey meter.
Figure 2B:
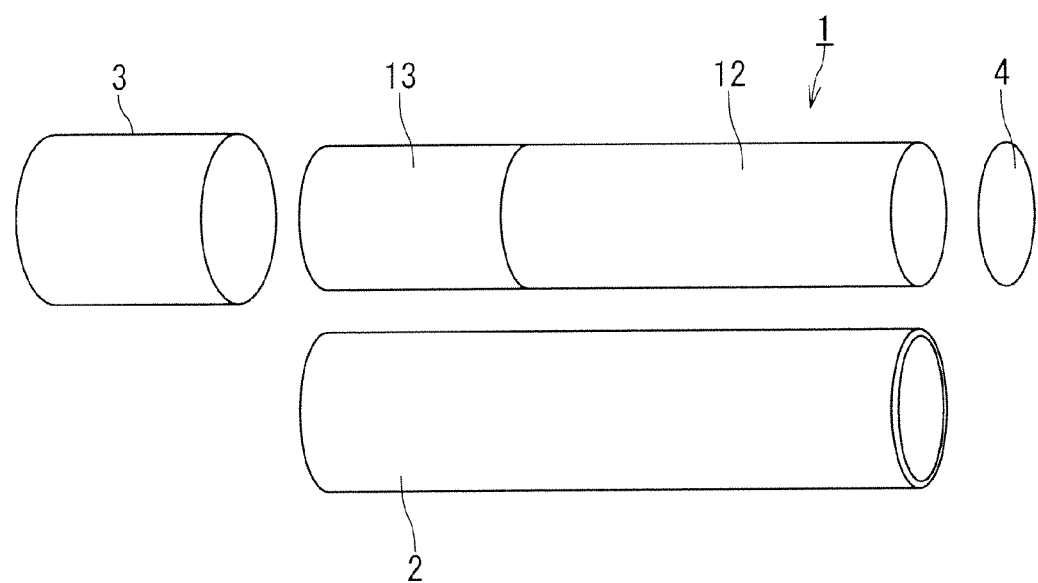
Figure 3:
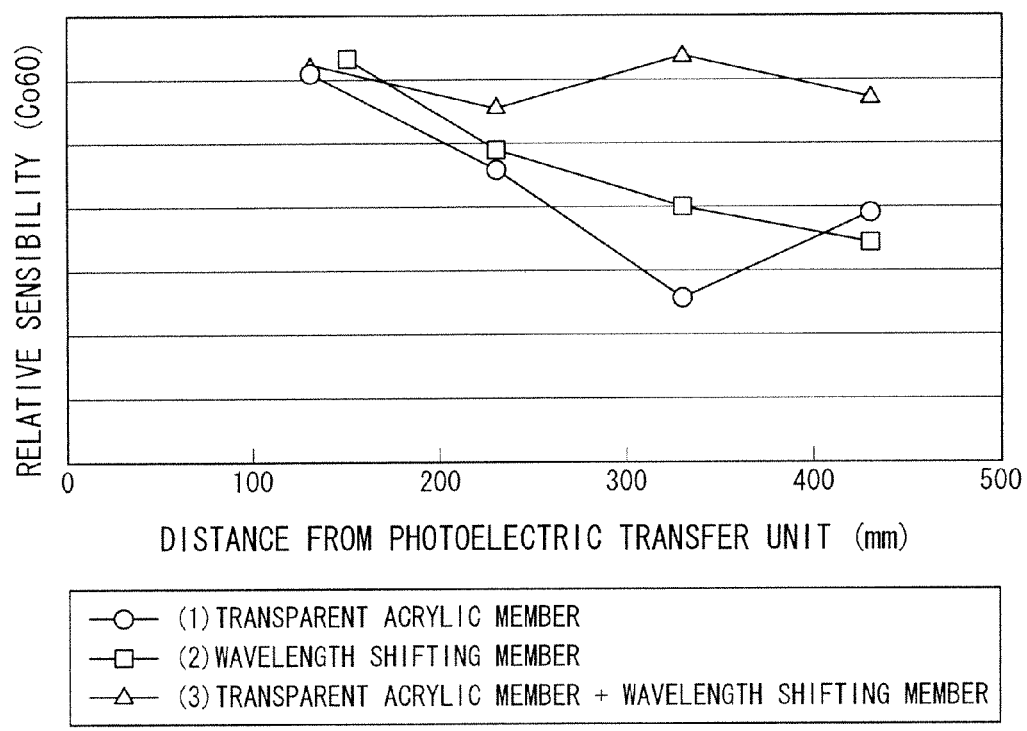
FIG. 3 is a graph showing a counting efficiency in the survey meter according to the first embodiment of the present invention.

FIGS. 1 to 3 are schematic views representing structures and characteristics of the survey meters according to a first embodiment of the present invention.

The first embodiment of the survey meter includes a light guide unit 1 formed of a rod-shaped hexagonal member having a predetermined length. As shown in FIG. 2A, the light guide unit 1 includes a first light guide section 12 composed of a fluorescence conversion material having a predetermined length and a second light guide section 13 composed of a transparent acrylic material having a predetermined length. In this survey meter, the first and second light guide sections 12 and 13 are optically connected to each other at respective end surfaces thereof.

In this connection, the term "optical connection" means a connection using an optical grease or an optical adhesive agent as a connecting medium for the purpose of suppressing a reflection and transmission loss of a light. The connecting medium can be optionally selected in accordance with conditions or situations for the connection.

A reflecting portion 4 for reflecting a fluorescent light is optically connected to an open-end surface portion of the first light guide section 12, while a photoelectric transfer unit 3 for detecting the fluorescent light and converting the fluorescent light into an electronic pulse so as to output an electronic signal, is optically connected to an open-end surface portion of the second light guide section 13.

A flat-plate shaped scintillator unit 2 is provided so as to tightly contact to a flat surface of the light guide unit 1. For example, as shown in FIG. 2A, the light guide unit 1 has the hexagonal shape, and hence, a plurality of, i.e. six, flat plate scintillator sections (unit 2) are provided. A wavelength conversing portion (wavelength shifting fiber) 5 is optically connected to a side-end surface portion of the scintillator unit 2. A light shielding member 6 is also provided for shielding the light radiating to the scintillator unit 2 and the wavelength conversing portion 5. The scintillator unit 2, the wavelength conversing portion 5 and the light shielding portion 6 constitute, in combination, a radiation detecting section 17.

The photoelectric transfer unit 3 is operated by being supplied with a high voltage from a high voltage power source 11. In the electronic signal outputted from the photoelectric transfer unit 3, a noise component generated by the photoelectric transfer unit 3 per se, a signal component obtained from a target radiation to be measured and a signal component (obstructive component) obtained from a not aiming radiation are existing in a mixed manner. In this regard, since a material for constituting the scintillator unit 2 and a thickness of the scintillator unit 2 had been suitably controlled in advance so that a high sensibility can be realized with respect to the radiation to be measured, a pulse height (wave height) of the signal component to be measured is sufficiently larger than those of the other signal components.

A pulse height discriminator 7 sets a pulse height threshold value in advance so as to enable the pulse height discriminator 7 to discriminate the signal component to be measured from the other signal components, and when the pulse height value of one electronic signal exceeds the threshold value, the pulse height discriminator 7 outputs one logical signal. The logical signal outputted from the photoelectric pulse height discriminator 7 is counted by a counter unit 8 for a predetermined counting time period.

In a contamination judging unit 9, the counting value obtained by the counter unit 8 is divided by the counting time (measuring time) to thereby calculate a counting rate. A background counting rate, which is previously obtained by measuring, is subtracted from the counting rate so as to calculate a net counting rate. When this net counting rate is larger than a contamination counting rate previously determined in advance, the contamination judging unit 9 judges that a radioactive contamination is caused. Then, the resultant net counting rate is outputted and then displayed on a display unit 10.

The pulse-height discriminator 7, the counter unit 8, the contamination judging unit 9, the display unit 10 and the high voltage power source 11 constitute a signal processing and display section 18.

Generally, in the survey meter (scintillation detector system) having a long size and a small diameter, as a detecting portion is apart from a photoelectric transfer unit, the detecting sensibility of the survey meter is inevitably lowered. Further, since a lower limit of detected radiation is evaluated on the basis of the lowest detecting sensibility, in order to improve the lower limit of detecting the radiation, it is necessary to improve the lowest detecting sensibility. Therefore, in the present embodiment, the light guide unit is configured by two members each having a different characteristic so as to improve a light conversing property.

A plastic scintillator having a thickness of 0.1 mm as the scintillator unit 2 is provided so as to tightly contact to the light guide unit 1 which has a length of 430 mm and is composed of hexagonal column having one side length of 4.5 mm. Under the following conditions, a detection sensibility ($^{60}$Co β-ray) with respect to a distance from the photoelectric transfer unit 3 was measured.

Case 1: the material constituting the light guide unit 1 is a transparent acrylic member.

Case 2: the material constituting the light guide unit 1 is a fluorescence conversion material.

Case 3: the material constituting the light guide unit 1 is a transparent acrylic member (230 mm) and a fluorescence conversion material (200 mm).

The measured examples of the detection sensibility are shown in FIG. 3. As is clear from the results shown in FIG. 3, When the Case 1 using the transparent acrylic member was compared with the Case 2 using the fluorescence conversion material, in the Case 1, a lowering of the sensibility is remarkable in a range from an intermediate portion to a portion close to a tail end portion of the transparent acrylic member, while the sensibility was improved at the tail end portion. On the other hand, in the Case 2, a remarkable lowering of the sensibility was not observed. However, there could be observed a tendency that the sensibility was gradually decreased depending on the distance from the fluorescence conversion material (wavelength shifting member).

The reason why above the tendency appears is as follows. That is, in the Case 1 using the transparent acrylic member, the fluorescent light spread by interreflection caused between the scintillator unit 2 and the light shielding unit 6 mainly incidents into the photoelectric transfer unit 3. In addition, a slight amount of the fluorescent light is generated in a case where a total reflection condition is realized in the transparent acrylic member because a surface of the acrylic member is not completely flat. This slight amount of the fluorescent light also incidents into the photoelectric transfer unit 3. Therefore, as the detecting portion is moved from a portion close to the photoelectric transfer unit 3 to a portion far from the photoelectric transfer unit 3, the detecting sensibility is disadvantageously lowered.

Further, the reason why the detecting sensibility is improved at the end portion of the light guide unit resides in that the total reflection condition of a part of the fluorescent light is realized due to an effect of the reflecting member optically connected to the end portion of the light guide unit.

On the other hand, in the Case 2 using the fluorescence conversion material, since the fluorescence conversion material is a self-luminous material, the total reflection condition at the respective distances is uniform. However, the transmission loss due to self-absorption will affect, so that the detecting sensibility is lowered.

The Case 3 corresponds to the embodiment of the present invention, in which the material constituting the light guide unit 1 is a transparent acrylic member (230 mm) and a fluorescence conversion material (200 mm). Herein, note that both the lengths specified as above indicate no optimum condition for the transparent acrylic member and the fluorescence conversion material. The optimum length of the first light guide section 12 or the second light guide section 13 is determined under a condition in which a minimum light amount arriving to the photoelectric transfer unit 3 can be obtained at a maximum value.

In the example of the Case 3, the attention is paid to a relation that the transmission loss of the fluorescent light due to the self-absorption in the Case 1 is smaller than that in the Case 2 (Case 1<Case 2). Namely, the transparent acrylic member is optically connected to the fluorescence conversion material, whereby the fluorescent light from the fluorescence conversion material under the total reflection condition is transmitted to the photoelectric transfer unit 3 through the transparent acrylic member. When the fluorescent light is transmitted through the transparent acrylic member, the transmission loss of the fluorescent light due to the self-absorption can be effectively suppressed.

On the other hand, in the transparent acrylic member portion, as the portion is apart from the photoelectric transfer unit 3, a light converging property ought to be lowered. However, the fluorescent light entering into the fluorescence conversion material from the transparent acrylic member again emits a light in the transparent acrylic member, and the emitted light spreads while repeating the total reflection, whereby the light converging property is improved in comparison with the case using only the transparent acrylic member. As a result, according to the embodiment of the Case 3, a total light amount arriving at the photoelectric transfer unit 3 is improved in comparison with the Case 1 using only the transparent acrylic member and the Case 2 using only the wavelength shifting member (fluorescence conversion material).

Further, when the light guide unit 1 is subjected to a mirror-polishing treatment so as to suppress micro irregularities formed on a surface thereof and to make the surface flat, an effect of improving a transmission efficiency of the fluorescent light internally captured by the total reflecting condition will be achieved.

Further, the scintillator unit 2 may be selected depending on the fact whether a kind of radioactive ray to be measured is α-ray or β-ray.

In a case where the radioactive ray to be measured is α-ray, although not shown, it is preferable to adopt a sheet-shaped scintillator which is manufactured through a method comprising the steps of: mixing ZnS(Ag) powder with a transparent solidifying material to prepare a mixed material; uniformly coating the mixed material onto a thin-transparent resin film so as to form a coated ZnS(Ag) layer having a predetermined thickness thereby to form a coated sheet; and working the coated sheet to thereby form the scintillator unit. Further, the coated ZnS(Ag) layer is set so as to be directed to an entrance plane of the radioactive ray. According to this structure, the radioactive ray is not absorbed in the transparent resin film, so that an attenuation of the radioactive ray can be prevented.

Further, since the thickness of a scintillator layer can be easily changed, it may be desired that the scintillator unit is made thin at a portion having a high radiation sensitivity to lower the sensibility of the portion. As a result, a sensibility distribution characteristic can be made further flat to be uniform.

Furthermore, the scintillator unit can be easily worked to be bent or deformed. Therefore, for example, when the scintillator unit is tightly contacted to the light guide unit 1 through an air layer interposed therebetween, and the scintillator unit and the light guide unit are wound or rolled in the tightly contacted state, the radiation detecting section 17 having a decreased diameter can be easily configured.

In this case, by forming the light guide unit so as to provide a circular-column shape as shown in FIG. 3, a tightly contacting degree can be increased, so that the light converging property is improved.

Furthermore, since the ZnS(Ag) powder is opaque powder, if the air layer is not interposed between the scintillator unit and the light guide unit 1, a total reflecting light spreading in the light guide unit 1 is disadvantageously absorbed and scattered, thereby lowering the light converging property.

In a case where the radioactive ray radiated from the measuring object is β-ray, it is preferable to adopt a plastic scintillator. Particularly, a plastic scintillator having a thickness of 0.3 mm or less can suppress the sensibility against γ-ray, so that it becomes possible to lower a background value as the survey meter.

When the radioactive ray enters into the plastic scintillator, a fluorescent light is emitted from an inner portion of the plastic scintillator. Since the emitted fluorescent light is uniformly spread at an isotropic angle, the emitted fluorescent light, which satisfies the total reflection condition at upper and lower surfaces of the scintillator, is released from an entire side end surface of the scintillator due to an internal capture.

In order to converge the fluorescent light gathering to this side end surface, for example, although not shown, a diffused reflecting member composed of titanium oxide may be optically connected to the side end surface in a longitudinal direction of the scintillator.

In contrast, in a case where a mirror-surface reflecting member is optically connected to the side end surface, the main fluorescent light is merely and repeatedly reciprocated between the two side end surfaces while the light is internally captured under the total reflecting condition. Accordingly, the fluorescent light is self-quenched at some future time due to attenuation.

Due to the diffused reflection, a part of the fluorescent light escapes from the internal capture and enters into the light guide. On the other hand, a part of the fluorescent light captured under the total reflection condition is released from both the end surfaces. Therefore, when the photoelectric transfer unit 3 is optically connected, the fluorescent light is directly entered into a photoelectric transfer surface. When a reflecting unit 4 is optically connected to another end surface, the fluorescent light causes a total reflection, thereby improving the light converging property.

In a case where the plastic scintillator is tightly contacted to the light guide unit 1, if an air layer is formed on a surface of the plastic scintillator, the total reflecting condition is realized through the plastic scintillator. Thus, the plastic scintillator and the light guide unit 1 may be optically connected to each other without interposing the air layer therebetween.

In a case where the scintillator unit 2 is worked to be thin so as to provide a cylindrical shape as shown in FIG. 3, when the light guide unit worked to provide a circular-column shape is disposed in the scintillator unit, the radiation detecting section 17 having a circular-column shape can be configured. In this case, when the measuring is performed with respect to inner surface of a piping, the distance between the detecting surface and the radiation detecting section 17 can be evenly controlled and minimized, thus effectively improving the measuring efficiency.

In contrast, in a case where the scintillator unit 2 can not be easily worked to be thin, when the light guide unit 1 is formed to provide a polygonal shape in section, a scintillator unit which is easily worked and having a flat plate shape may be provided.

As a material for constituting the light shielding unit 6, an aluminum-deposited Mylar sheet may be used. The Mylar sheet is, for example, manufactured by preparing a polyester film having a thickness of several microns capable of being transmitted by α-ray and β-ray, and capable of blocking an incident light and by depositing aluminum onto the polyester film so that a deposited aluminum layer has a thickness of several microns order. The thickness and a laminating number of the Mylar sheet are optimized in accordance with kinds and energy levels of the radioactive rays.

Further, the scintillator unit 2 and the light shielding unit 6 are not optically connected but tightly contacted to each other with interposing an air layer therebetween.

In a case where the scintillator unit 2 is formed to be a plastic scintillator such transmittance is remarkable with respect to a transparent acrylic member portion of the light guide unit 1. In the transparent acrylic member, the total reflection condition is not realized. Therefore, the fluorescent light arriving at the photoelectric transfer unit 3 is mainly composed of a light which is propagated while repeating an interreflection caused at a portion between the scintillator unit 2 and the light shielding unit 6. Accordingly, when the scintillator unit 2 and the light shielding unit 6 are optically connected to each other, the propagation of the fluorescent light due to the interreflection is not realized. Therefore, a light entering into the photoelectric transfer unit 3 is mainly composed of a direct light emitted from the scintillator unit 2 and a slight amount of the fluorescent light propagated in the transparent acrylic member where the total reflection condition is realized because a surface of the transparent acrylic member is not completely flat. As a result, the light converging property is disadvantageously lowered.

As a material for constituting the reflecting unit 4, it is preferable to adopt a material having high reflection efficiency which is capable of obtaining a specular (mirror) reflection effect. The higher reflection efficiency can realize the further improved light converging property. For example, when an aluminum-deposited Mylar film (aluminum-Mylar film) is optically connected, a good reflection property is easily obtainable.

As the photoelectric transfer unit 3, a photo multiplier tube having suitable wavelength sensibility and size may be used. The photo-multiplier tube is used for securing the quantum efficiency for converting a light into an electron by the action of a photo-electric effect. The photo-multiplier tube is operated by being applied with a high voltage of about 1000 V supplied from a high voltage power source 11 through a dedicated breeder resistance circuit.

A wavelength shifting fiber 5 composed of a fluorescent light conversion material is optically connected to a side end surface of the scintillator unit 2. A length of the wavelength shifting fiber 5 may be the same as that of the light guide unit 1. The end surfaces of the wavelength shifting fiber 5 are optically connected to the photoelectric transfer unit 3 and the reflecting unit 4. The fluorescent light emitted from the side end surface of the scintillator unit 2 is absorbed into the wavelength shifting fiber 5 to be thereby converted into a fluorescent light having a longer wavelength. The converted light is propagated in the wavelength shifting fiber 5 under the total reflection condition, and then enters into the photoelectric transfer unit 3, so that the light converging property can be effectively improved.

As described above, according to this embodiment of the present invention, the radiation detecting section 17 can be easily formed to provide a long length and a small diameter. In addition, the detecting sensibility in the longitudinal direction can be made flat and uniform, and a minimum detecting sensibility can be improved, so that a lower limit of detecting the radioactive ray is improved.

As explained above, according to the described embodiment, the radiation detecting section 17 is easily formed so as to provide a long length and a small diameter with a low cost.

Further, in the example shown in FIG. 2A, the light guide unit 1 including the first and second light guide sections 12 and 13 has a hollow hexagonal rod structure having a hexagonal shape in cross section, the wavelength conversing portion (wavelength shifting fiber) 5 is optically connected to a side-end surface portion of the scintillator unit 2, which has a plate shape, and the light shielding member 6 is fitted for shielding the light radiating to the scintillator unit 2 and the wavelength conversing portion 5. In this example, six wavelength conversing fibers 5 and six plate scintillator sections (unit 2) are provided. The scintillator unit 2, the wavelength conversing portion 5 and the light shielding portion 6 constitute, in combination, a radiation detecting section 17.

On the other hand, as shown in FIG. 2B, the light guide unit 1 including the first and second light guide sections 12 and 13 may have a circular-columnar structure having a circular cross section, and the scintillator unit 2 also has a hollow circular-columnar shape having a circular cross section, into which the light guide unit 1 is fitted. A circular-columnar shielding member, not shown, like the shielding member 6 in FIG. 2A, may be also fitted to the scintillator unit 2.

Embodiment 2

Figure 4:
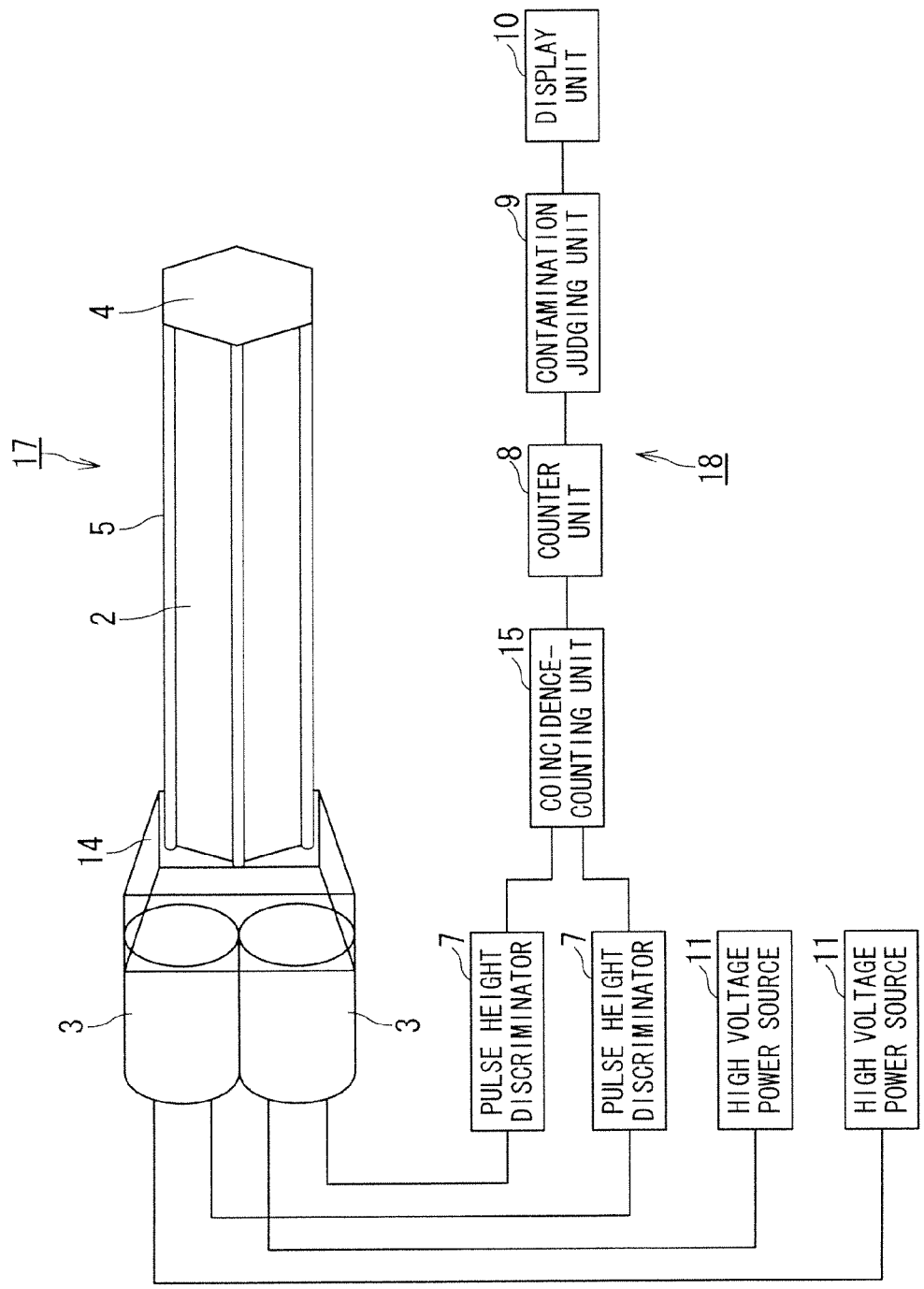
FIG. 4 is a schematic view showing a structure of a survey meter according to a second embodiment of the present invention.
Figure 5:
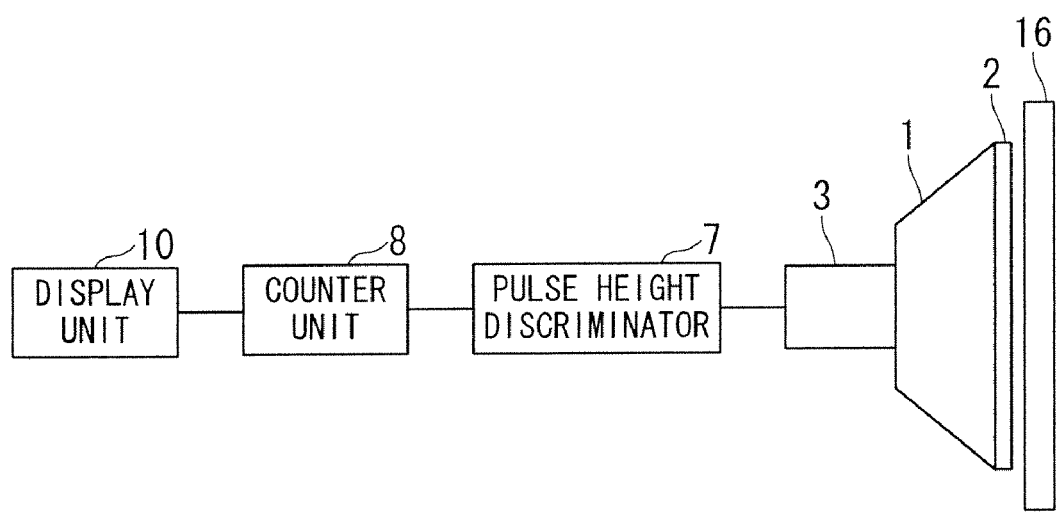
FIG. 5 is a schematic view showing a structure of a conventional survey meter.

FIG. 4 is schematic view showing structure of a survey meter of a second embodiment according to the present invention. The second embodiment of the survey meter shown in FIG. 4 is configured to further include the following elements in addition to the structure of the survey meter of the first embodiment. That is, the survey meter further comprises: a light adapter section 14 composed of a transparent member which is provided so as to be optically connected to both the light guide 1 and two photoelectric transfer units 3, 3; two pulse-height discriminator units 7, 7 independently provided so as to be connected to the two photoelectric transfer units 3, 3; and a coincidence-counting process unit 15 for outputting one logic signal when each of logic signals outputted from the respective two pulse-height discriminator units 7, 7 coincidentally exist at the same time.

As a material for constituting the light adapter section 14, a transparent acrylic member may be suitable. Although not shown, after an entire surface of the light adapter portion 14 is subjected to a mirror-polishing treatment, and then, a diffused reflection material composed of titanium oxide is coated onto an entire surface of the light adapter section 14 except a portion used for the optical connection, whereby a possibility of the fluorescent light, which is captured within inner portion of the light adapter section 14, entering into the two photoelectric transfer units 3, 3 can be improved.

Further, in this embodiment, the circular-columnar structure may be applied to the light guide unit like the example shown in FIG. 2B.

As described above, according to the present embodiment having the structure mentioned above, a background value as for the survey meter can be effectively lowered.

It is to be noted that the present invention is not limited to the described embodiments and many other changes and modifications may be made without departing from the scopes of the appended claims.

What is claimed is:

1. A survey meter for measuring a radioactive contamination caused in an inner surface of a pipe, the survey meter comprising:
    a rod-shaped light guide unit having a predetermined length, the light guide unit including a first light guide section including a fluorescent conversion material and a second light guide section including a transparent material, in which the first and second light guide sections are connected to each other at respective one end surfaces thereof;
    a reflecting portion connected to another end surface of the first light guide section;
    a photoelectric transfer unit, for outputting an electronic signal, connected to another one end surface of the second light guide section;
    a scintillator unit provided to a circumferential surface of the light guide unit in which the first and second light guide sections are connected to each other;
    a shielding member configured to transmit radioactive rays, block a light radiated from outside, and reflect a light within the scintillator unit;
    a pulse height discriminator for outputting a logic signal at a time when a pulse height value of the electronic signal outputted from the photoelectric transfer unit is higher than a threshold value;
    a counter unit for counting the logic signal outputted from the pulse height discriminator;
    a contamination judging unit for judging whether a radioactive contamination is caused or not on the basis of a value counted by the counter unit; and
    a display unit for displaying the value counted by the counter unit and a contamination judging result judged by the contamination judging unit.

2. The survey meter according to claim 1, wherein the light guide unit is formed to provide a polygonal shape in cross section.

3. The survey meter according to claim 2, wherein the light guide unit has a hexagonal shape in cross section.

4. The survey meter according to claim 2, further comprising a wavelength conversing member optically connected to a side-end surface portion of the scintillator unit.

5. The survey meter according to claim 4, wherein the wavelength conversing member is wavelength fibers disposed along an entire longitudinal surface of the light guide unit.

6. The survey meter according to claim 4, wherein the scintillator unit is formed to provide a flat-plate structure including a plurality of plate members and the wavelength fibers each composed of a fluorescence material and disposed between adjacent plate members, each of the fiber portions having one end surface connected to the reflecting portion and another end portion connected to the photoelectric transfer unit.

7. The survey meter according to claim 2, wherein the scintillator unit is formed to provide a flat-plate structure provided to the side surface of the polygonal light guide unit, and the reflecting portion is disposed to a side surface in a longitudinal direction of the scintillator unit.

8. The survey meter according to claim 1, wherein the first light guide section is composed of a fluorescence conversion material and the second light guide section is composed of a transparent material.

9. The survey meter according to claim 1, wherein the light guide unit is formed to provide a circular-column shape.

10. The survey meter according to claim 1, wherein the photoelectric transfer unit includes two or more of photoelectric transfer elements, and the survey meter further comprising a coincidence-counting section which and processes the logic signal transmitted from the photoelectric transfer unit.

11. The survey meter according to claim 1, further comprising a light adapter unit disposed to a portion between the light guide unit and the photoelectric transfer unit so as to be connected thereto, and the reflecting portion is connected to a surface other than a connecting surface of the light adapter unit.

12. The survey meter according to claim 1, wherein the shielding member is an aluminum deposited Mylar film.

13. A survey meter for measuring a radioactive contamination caused in an inner surface of a pipe, the survey meter comprising:
    a radiation detecting section including a rod-shaped light guide unit having a predetermined length and including a first light guide section including a fluorescent conversion material and a second light guide section including a transparent material, a reflecting portion connected to one end surface of the light guide unit, a photoelectric transfer unit, for outputting an electronic signal, connected to another one end surface of the light guide unit, and a scintillator unit provided to a circumference of the light guide unit; and
    a signal processing section including a pulse height discriminator for outputting a logic signal at a time when a pulse height value of the electronic signal outputted from the photoelectric transfer unit is higher than a threshold value; a counter unit for counting the logic signal outputted from the pulse height discriminator; a contamination judging unit for judging whether a radioactive contamination is caused or not on the basis of a value counted by the counter unit; and a display unit for displaying the value counted by the counter unit and a contamination judging result judged by the contamination judging unit.

* * * * *